Oct. 25, 1949.  G. C. MAYFIELD  2,486,359

PISTON RING

Filed Sept. 27, 1945

INVENTOR
GEORGE C. MAYFIELD

BY Bruninga and Sutherland
ATTORNEYS

Patented Oct. 25, 1949

2,486,359

UNITED STATES PATENT OFFICE 2,486,359

PISTON RING

George C. Mayfield, Richmond Heights, Mo., assignor to McQuay-Norris Manufacturing Company, St. Louis, Mo., a corporation of Delaware Application September 27, 1945, Serial No. 618,857

11 Claims. (Cl. 309—45)

This invention relates generally to piston rings and particularly to piston rings which are circumferentially compressible.

Circumferentially compressible piston rings have long been proposed (Kelsey Patent No. 657,548, September 11, 1900) and divers efforts have been made to adapt the principle of circumferential compressibility to piston rings for internal combustion engines. In recent years patents, too numerous to enumerate, have been granted upon structures envisioned to embody application of the principle of circumferential compressibility to piston rings, but, despite the copiousness of the proposals and the academic reasoning of the proponents, the stark reality is that none such has measured up to the requirements of practical operation to the extent that commercialization was ventured.

That some advantages inhere in circumferential compressibility is almost universally recognized, but embodiment thereof in piston rings suitable for use in internal combustion engines has involved sacrifice of benefits obtainable with other types of rings. The workers in the art have apparently been imbued with the mistaken idea that such rings should embody a succession of sections each as freely movable relative to its neighbor as possible. Such has not only resulted in instability of the resultant ring, but face separation of the section has involved discontinuity of the edge or face of the ring.

The object of the present invention, generally stated, is to provide a circumferentially compressible piston ring which will fulfill the requirements of practical operation in an internal combustion engine.

Another object is to provide a circumferentially compressible piston ring in which objectionable vibration of the substantial separate sectors is avoided.

Other objects of the invention will become apparent to those skilled in the art when the following description is read in connection with the accompanying drawings, in which.

Figure 9:
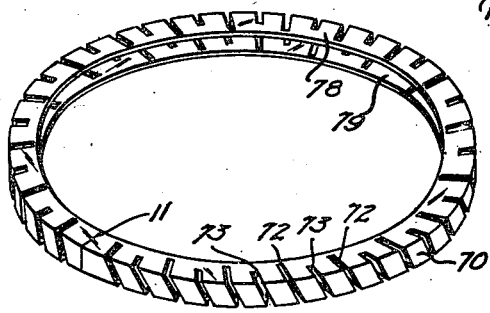
Figure 10:
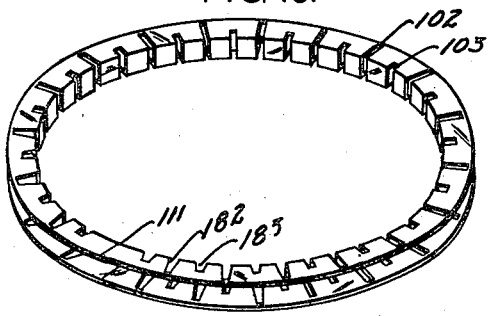
Figure 5:
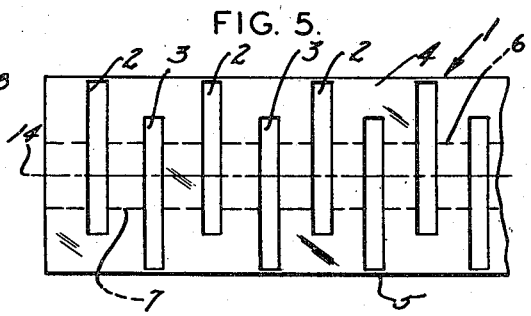
Figure 5 is a plan view of a strip of material from which the ring shown in Figure 1 may be made.
Figure 6:
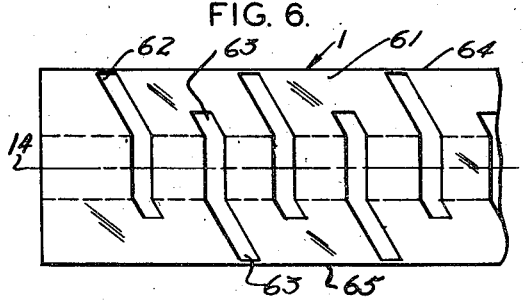
Figure 7:
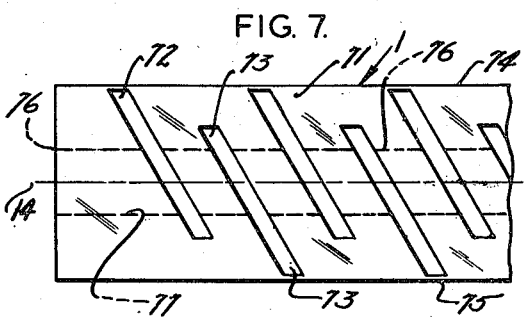
Figure 8:
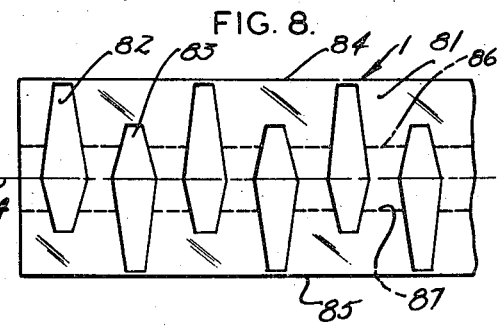

Figures 6, 7, and 8 are views corresponding to Figure 5, but showing different embodiments;

Figure 9 is a perspective view of one form of ring produced from material such as shown in Figure 7; and Figure 10 is a perspective view of another embodiment.

In accordance with the present invention, a piece of suitable piston ring material, such as ribbon steel, ribbon brass, or bronze, is formed into a circumferentially compressible piston ring by the provision therein of a series of incisions so arranged that the incisions do not reach the marginal edge of the strip and hence continuous edges remain integral with the body of the strip. The present invention contemplates that one end of the respective incision extends very close to the marginal edge of the strip, so as to provide between the terminus of such incision and the marginal edge of the strip a web having a length equal to the width of the incision and a cross sectional dimension of lesser magnitude. Consequently, while the web just referred to may flex to a minute degree, it constitutes a stabilizing connection between the portions of metal on opposite sides of the incision and consequently dampens vibration thereof. The present invention, however, contemplates that such incisions, while extending very close to one marginal edge of the strip, terminate substantially short of the other marginal edge. Such incisions are repeated in series throughout the length of the ring and preferably alternate in approaching very close to opposite edges of the material. Having thus provided the series of incisions in the piston ring material, the material may be bent into a configuration suitable for use as a piston ring. Such configuration preferably takes the form of a channel, which may be either an open channel or a collapsed channel, it being understood, however, that each of the incisions extends not only through at least one side wall of the channel (terminating short of the edge), but through the bottom of the channel for the full extent of the latter.

Referring now to Figures 1 to 5, inclusive, of the drawings for an illustrative embodiment of the invention, a strip of piston ring material I is provided with a series of incisions 2 and 3 extending crosswise thereof in substantially equispaced relation throughout the length required to make a piston ring. Such incisions 2 and 3 may be punched or sawed, as desired.

As clearly shown in Figure 5, the incision 2 extends very close to the marginal edge 4 of the strip 1, but terminates substantially short of the marginal edge 5. Contrariwise, incisions 3 extend very close to marginal edge 5, but terminate substantially short of marginal edge 4. By extending "very close" to the edge, as the expression is herein used, it may be understood that a finite dimension of from 0.002 to 0.030 inch is contemplated for piston rings of the character employed in ordinary automotive internal combustion engines.

The thus perforated strip may then be bent at right angles along lines 6 and 7 to form a channel structure wherein the portion embraced between lines 6 and 7 constitutes the bottom of the channel and the portions extending outwardly thereof constitute the flanges. The distance between the marginal edge 4 and the line of bending 6 is preferably, as near as may be, the same distance as between marginal edge 5 and line of folding 7. Each of the marginal edges 4 and 5, it will be observed, are continuous from one end of the strip to the other.

Figure 1:
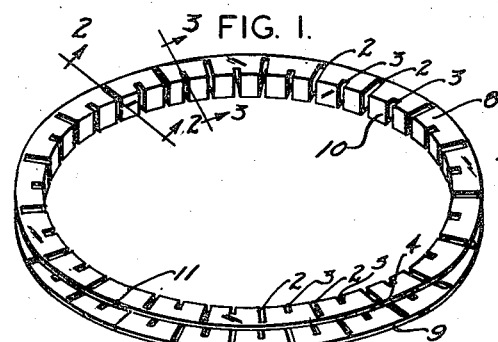
Figure 1 is a perspective view of a piston ring constructed in accordance with this invention.
Figure 2:
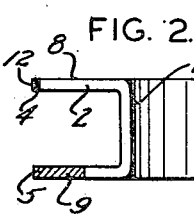
Figure 2 is a sectional view taken along line 2—2 of Figure 1.
Figure 3:
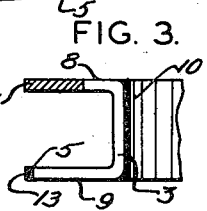
Figure 3 is a sectional view taken along the line 3—3 of Figure 1.

The structure resulting from the procedure just described is shown in Figure 1 and constitutes a channel-shaped piston ring having an upper flange 8 and a lower flange 9, the marginal edges of which are continuous, interconnected by a rear face 10. The line of parting, representative of the ends of the strip 1, is indicated at 11 and it will be observed that the respective ends of the ring preferably abut. The incisions 2 and 3 are repeated in series throughout the circumferential length of the ring, the incision 2 extending very near to (e. g. within 0.005 inch of) the marginal edge of flange 8. In the embodiment illustrated, the incision 2 extends so close to the marginal edge 4 that the web 12 of material remaining between the terminus of incision 2 and marginal edge 4 has a cross sectional dimension (radial) less than the length of such web (i. e. the width of the incision) and, in fact in the embodiment illustrated, less than the other cross sectional dimension (axial) of such web.

Conversely, the incisions 3 extend very close to marginal edge 5, so as to leave a web 13 between the terminus of the incisions 3 and said marginal edge, said web being of a cross section comparable to the web 12 above described.

Figure 4:
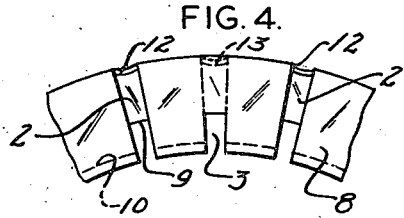
Figure 4 is a detailed plan view of a sector of the ring shown in Figure 1.

When such a piston ring has assumed an annular configuration, it will be apparent that the incisions 2 and 3 become somewhat contracted at the inner wall of the ring, as clearly shown in Figure 4. When the annular ring with its ends abutting is subjected to a contracting force, further reduction in its circumferential extent is accomplished by slight yielding or bowing of the webs 12, 13, as illustrated in an exaggerated manner with respect to webs 12 in Figure 4. Such bowing of the webs 12 is a result of the limited cross section thereof and, while in the embodiment shown, the bowing is in a radial direction, such will be understood to be an incident of the construction wherein the radial dimension of the web is its least dimension. The bowing may, however, be caused to take place in an axial direction by appropriate reduction of the axial dimension of the webs, i. e., the thickness of the piston ring material thereadjacent. While the webs 12 and 13 may thus bow when the ring is circumferentially compressed preparatory to insertion in a cylinder, it may sometimes be desirable to pre-bow such webs. While the bowing of the webs 12 and 13 in the nute, such minute bowing, when multiplied throughout the lineal extent of the piston ring, is adequate to provide the degree of contraction and expansion required in practical operation in an internal combustion engine. Moreover, should one or a few of the webs 12 and 13 be stressed beyond its elastic limit or, for that matter, ruptured, the ring will continue to be operative, as the only result thereof will be a subtraction of the stability of the sections of the ring immediately thereadjacent.

If it be desired to form the ring as a collapsed channel rather than an open one, as just described, the strip of material 1 may be folded along its center line 14, in lieu of folding along lines 6 and 7, it being understood that in such case a strip of material 1 of given width will produce a ring having a greater radial dimension than when folded along lines 6 and 7, but, if a ring of same radial dimension is desired, a narrower strip of material 1 may be utilized.

An open channel ring of the character illustrated in Figures 1 to 4, inclusive, may be employed either alone or in conjunction with a filler ring occupying the space between flanges 8 and 9. Such a filler ring may take the form, for example, of an ordinary C-type piston ring of any desired material or may take the form of independent sections of piston ring material. If desired, any suitable type of supplemental expander may be employed behind the ring in engagement with the back 10 of the ring.

While the structures herein disclosed may be made of any suitable piston ring material adapted for the purpose, ribbon steel conforming to either of the following specifications:

| | | | |
|---|---|---|---|
| Carbon | .65 to .85 | Carbon | .90 to 1.00 |
| Manganese | .45 to .90 | Manganese | .40 to .60 |
| Silicon | .15 to .30 | Silicon | .15 to .80 |
| Phosphorus— | .04 maximum | Phosphorus | .04 maximum |
| Sulphur | .05 maximum | Sulphur | .05 maximum | is suitable for the purpose. Rings fabricated of such steel may, after treatment as aforesaid, be hardened and tempered to a hardness of from 66 to 72 on the 30 N scale (Rockwell).

In Figure 6 of the drawings, the strip of material 61 is provided with incisions 62 and 63, the former extending very close to margin 64 and the latter extending very close to margin 65, as in the case of the previously described embodiment, the difference between the embodiment shown in Figure 6 and that shown in Figure 5 being in the inclination of the extremities of the incisions 62 and 63. Corresponding portions of the respective incisions are preferably substantially parallel, but in the embodiment shown, the extremities thereof are oblique to the radii of the completed ring, while the intermediate portions are substantially axial with respect to the completed ring.

In Figure 7, the strip of material 71 is provided with oblique incisions 72 and 73, the former extending very close to marginal edge 74 and the latter extending very close to marginal edge 75, as in the previous case. In this embodiment it will be observed that the intersection of the left wall of incision 72 by fold line 77 is to the right of the intersection of the right wall thereof with fold line 76. The resultant structure, when folded along lines 76 and 77, as previously described with respect to the previous embodiment, may be utilized as a piston ring either with the marginal edges 74 and 75 as the cylinder-engaging surface, or with such marginal edges facing in- A ring of the latter type is shown in Figure 9, where it will be observed that the flanges 78 and 79 extend inwardly from the bottom of the channel 70, which latter constitutes the cylinder-engaging surface. The oblique arrangement of the intermediate portion of the slots 72 and 73, as above described, however, provides a structure which will not score the cylinder wall as the ring reciprocates. Within the channel formed by the flanges 68 and 69, any suitable supplemental expander may be utilized, if desired, or the expander may be permitted to bear against the marginal edges 64 and 65.

Obviously, as with the embodiment shown in Figure 1, the material perforated and channeled, as described with reference to Figure 7, may be utilized with the marginal edges constituting the cylinder-engaging surface, i. e., inside-out from the form shown in Figure 9.

In Figure 8, the strip of material 81 is provided with double trapezoidal incisions 82 and 83, the former extending very close to marginal edge 84 and the latter very close to marginal edge 85, as in the previous cases. As in the previous embodiment, it will be observed that the intersection of the sides of the incisions 82 and 83 with the fold line 87 is axially disaligned with the intersection thereof by fold line 86. Consequently, this embodiment lends itself to utilization with the marginal edges faced outwardly, as in Figure 1, or inwardly, as in Figure 9.

In Figure 10 of the drawings, the ring is provided with incisions 182 and 183 of the character shown in Figure 8 near the abutting ends 111, while throughout the major portion of its periphery, the incisions 102 and 103 are of the type shown in Figure 5. Such an arrangement minimizes the tendency of the stress in the ring when in position in a cylinder to accummulate near the abutting ends and consequently distributes the stress more uniformly throughout the periphery of the ring.

Those skilled in the art will readily understand the operation of the ring from the foregoing description and realize that the invention is not limited to the particular form and arrangement of slots, as shown in the several embodiments.

Having thus described the invention, what is claimed and desired to be secured by Letters Patent is:

1. A piston ring comprising a channel having edges continuous from end to end of the ring, the ends of the channel abutting when in operation, and incisions in the channel extending from near one edge toward and across the bottom of the channel and therebeyond toward the other edge, said incisions terminating short of both edges but being substantially eccentric so that substantially more substance remains beyond one end of the incision than remains beyond the other end, thereby forming a series of circumferentially flexible webs at the peripheral edges of the ring.

2. A piston ring comprising a channel having edges continuous from end to end of the ring, and incisions in the channel extending from near one edge toward the other edge but terminating substantially short of the latter, said incisions approaching the first mentioned edge to the extent that the web remaining between the end of the incision and the edge of the ring has a lesser cross sectional dimension than the width of the incision and is circumferentially flexible.

3. A piston ring comprising a channel having edges continuous from end to end of the ring, and incisions in the channel extending from near one edge toward the other edge but terminating substantially short of the latter, said incisions alternately approaching near to opposite edges of the channel to provide circumferentially flexible bridges thereat.

4. A piston ring comprising a channel having edges continuous from end to end of the ring, and incisions in the channel extending from near one edge toward the other edge but terminating substantially short of the latter, said incisions approaching the first mentioned edge to the extent that the web remaining between the end of the incision and the edge of the ring has a lesser cross sectional dimension than the width of the incision and is circumferentially flexible, and said incisions alternately approaching near to opposite edges of the channel.

5. A piston ring comprising a channel having edges continuous from end to end of the ring, the ends of the channel abutting when in operation, incisions in the channel extending from a point spaced from one edge at a distance less than the channel thickness, said incisions extending toward and across the bottom of the channel and therebeyond but terminating substantially short of the other edge, and other incisions correspondingly extending from near the last mentioned edge toward the first mentioned edge, said first and last mentioned incisions alternating throughout the extent of the ring, thereby forming a series of circumferentially flexible webs at the peripheral edges of the ring.

6. A piston ring comprising a channel having edges continuous from end to end of the ring, the ends of the channel abbuting when in operation, incisions in the channel extending from a point spaced from one edge at a distance less than the channel thickness, said incisions extending toward but terminating substantially short of the other edge, and other incisions correspondingly extending from near the last mentioned edge toward the first mentioned edge, said first and last mentioned incisions alternating throughout the extent of the ring, the intermediate portions of said incisions extending in a direction substantially axial of the ring, thereby forming a series of circumferentially flexible webs at the peripheral edges of the ring.

7. A piston ring comprising a channel having edges continuous from end to end of the ring, the ends of the channel abutting when in operation, incisions in the channel extending from a point spaced from one edge at a distance less than the channel thickness, said incisions extending toward but terminating substantially short of the other edge, and other incisions correspondingly extending from near the last mentioned edge toward the first mentioned edge, said first and last mentioned incisions alternating throughout the extent of the ring, the intermediate portions of said incisions being substantially parallel but inclined with respect to the axis of the ring, thereby forming a series of circumferentially flexible webs at the peripheral edges of the ring.

8. A piston ring comprising a channel having edges continuous from end to end of the ring, the ends of the channel abutting when in operation, incisions in the channel extending from a point spaced from one edge at a distance less than the channel thickness, said incisions extending toward but terminating substantially short of the other edge, and other incisions correspondingly extending from near the last mentioned edge toward the first mentioned edge, said first and last mentioned incisions alternating throughout the extent of the ring, the extremities of the incisions being oblique to the radii of the ring and the intermediate portions of the incisions being substantially axial to the ring, thereby forming a series of circumferentially flexible webs at the peripheral edges of the ring.

9. A piston ring comprising a channel having edges continuous from end to end of the ring, the ends of the channel abutting when in operation, and incisions in the channel extending from near one edge toward the other edge but terminating substantially short of the latter, said incisions being gradually tapered from a minimum width near the outer periphery toward a greater width at the inner periphery, thereby forming a series of circumferentially flexible webs at the peripheral edges of the ring.

10. A piston ring comprising a channel having edges continuous from end to end of the ring, the ends of the channel abutting when in operation, and incisions in the channel extending from near one edge toward the other edge but terminating substantially short of the latter, said incisions near the ends of the ring being wider at the inner periphery of the ring than at their outer extremities and wider than the incisions throughout the intermediate portion of the ring, thereby forming a series of circumferentially flexible webs at the peripheral edges of the ring.

11. A piston ring comprising a channel having edges continuous from end to end of the ring, the ends of the channel abutting when in operation, and incisions in the channel extending from near one edge toward the other edge but terminating substantially short of the latter, the incisions near the ends of the ring being larger than in the intermediate portion of the ring, thereby forming a series of circumferentially flexible webs at the peripheral edges of the ring.

GEORGE C. MAYFIELD.

REFERENCES CITED

The following references are of record in the file of this patent:

UNITED STATES PATENTS

| Number | Name | Date |
| --- | --- | --- |
| 2,290,499 | Smith | July 21, 1942 |
| 2,334,243 | Bowers | Nov. 16, 1943 |
| 2,362,287 | Mason | Nov. 7, 1944 |
| 2,404,140 | McFall | July 16, 1946 |
| 2,452,503 | Teetor | Oct. 26, 1948 |

FOREIGN PATENTS

| Number | Country | Date |
| --- | --- | --- |
| 13,592 | Great Britain | July 13, 1893 |